(12) United States Patent
Andarawis et al.

(10) Patent No.: US 8,536,878 B2
(45) Date of Patent: Sep. 17, 2013

(54) AUTOMATED SENSOR SPECIFIC CALIBRATION THROUGH SENSOR PARAMETER DOWNLOAD

(75) Inventors: Emad Andarawis Andarawis, Ballston Lake, NY (US); Wayne Charles Hasz, Pownal, VT (US); David So Keung Chan, Niskayuna, NY (US); David Mulford Shaddock, Troy, NY (US); John Harry Down, Lanesborough, MA (US); Samhita Dasgupta, Niskayuna, NY (US); David Walter Parry, Cincinnati, OH (US); David Richard Esler, Gloversville, NY (US); Zhiyuan Ren, Malta, NY (US); Mahadevan Balasubramaniam, Ballston Lake, NY (US); William Lee Herron, Cincinnati, OH (US); Cheryl Herron, legal representative, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 274 days.

(21) Appl. No.: 13/206,740

(22) Filed: Aug. 10, 2011

(65) Prior Publication Data
US 2011/0295538 A1    Dec. 1, 2011

Related U.S. Application Data

(62) Division of application No. 12/360,485, filed on Jan. 27, 2009, now Pat. No. 8,022,715.

(51) Int. Cl.
*G01R 35/00* (2006.01)
*G01R 27/26* (2006.01)

(52) U.S. Cl.
USPC ............................................ 324/601; 324/662

(58) Field of Classification Search
USPC .................................................. 324/601, 662
See application file for complete search history.

(56) References Cited

U.S. PATENT DOCUMENTS

| | | | |
|---|---|---|---|
| 7,161,476 B2 | 1/2007 | Hardman et al. |
| 7,180,305 B2 | 2/2007 | Andarawis et al. |
| 7,215,129 B1 | 5/2007 | Andarawis et al. |
| 7,332,915 B2 | 2/2008 | Andarawis et al. |
| 7,333,913 B2 | 2/2008 | Andarawis et al. |
| 7,404,331 B2 | 7/2008 | Ruud et al. |
| 7,466,143 B2 | 12/2008 | Andarawis et al. |

(Continued)

OTHER PUBLICATIONS

Emad Andarawis Andarawis et al.; "Systems and Methods for Online Phase Calibration"; Pending U.S. Appl. No. 12/054,548, filed Mar. 25, 2008; (24 pages).

(Continued)

*Primary Examiner* — Vincent Q Nguyen
(74) *Attorney, Agent, or Firm* — Penny A. Clarke

(57) ABSTRACT

A sensor system for measuring a clearance parameter between a stationary component and a rotating component of a rotating machine is provided. The system includes a clearance sensor to output a clearance measurement signal. A sensor memory is attached to the sensor for storing a first sensor information. A second sensor information is stored in a electronics interface memory. The first and the second sensor information are read and the clearance sensor is matched with a respective plurality of calibration data by an electronic interface based on the first and the second sensor information.

9 Claims, 3 Drawing Sheets

(56) References Cited

U.S. PATENT DOCUMENTS

| | | |
|---|---|---|
| 2003/0060986 A1 | 3/2003 | Flotow |
| 2005/0218887 A1 | 10/2005 | Twerdochlib |
| 2006/0132147 A1 | 6/2006 | Balasubramaniam et al. |
| 2006/0239813 A1 | 10/2006 | Shah et al. |
| 2007/0005294 A1 | 1/2007 | Andarawis et al. |
| 2007/0128016 A1 | 6/2007 | Dasgupta et al. |
| 2007/0156363 A1 | 7/2007 | Stewart et al. |
| 2007/0194894 A1 | 8/2007 | Beckley et al. |
| 2009/0003991 A1 | 1/2009 | Andarawis et al. |

OTHER PUBLICATIONS

Emad Andarawis Andarawis et al.; "Systems for Inspection of Shrouds"; Pending U.S. Appl. No. 12/054,565, filed Mar. 25, 2008; (22 pages).

David So Keung Chan et al.; "Clearance Estimation System and Method for a Rotary Machine"; Pending U.S. Appl. No. 12/118,904, filed May 12, 2008; (28 pages).

Emad Andarawis Andarawis et al.; "Electronic Self-Calibration for Sensor Clearance"; Pending U.S. Appl. No. 12/241,499, filed Sep. 30, 2008; (28 pages).

EP 10151311 Search Report, Jun. 4, 2010.

AUTOMATED SENSOR SPECIFIC CALIBRATION THROUGH SENSOR PARAMETER DOWNLOAD

CROSS REFERENCE TO RELATED APPLICATION

This Application is a divisional of U.S. patent application Ser. No. 12/360,485, entitled "AUTOMATED SENSOR SPECIFIC CALIBRATION THROUGH SENSOR PARAMETER DOWNLOAD," filed 27 Jan. 2009, which is herein incorporated by reference.

BACKGROUND

The present description relates generally to a method and a system for automatic download of calibration data of a sensor into electronics interface of a sensor system, and more specifically to conveying physical sensor parameters to the electronics interface.

Various types of sensor systems are used to measure various parameters. In addition, such sensor systems are used in various applications. For example, in turbine systems, the sensor systems are used to measure a clearance between a static shroud and turbine blades. Such sensor systems typically include sensors and electronics interface. In general, the sensor output may not provide the signal indicative of a parameter to be measured. The electronics interface is configured to convert the sensor output signal to a signal representative of the parameter to be measured or in other words to provide a calibrated result. The conversion from the sensor output signal to the signal representative of the parameter to be measured is based on the sensor characteristics or calibration data of the sensor.

New installations of sensors in the sensor system cause sensor variations. This results in significant error in the measurement if the electronics interface is not calibrated accordingly. Sensor variations include manufacturing variations or performance variations. In general, a very tight constraint on manufacturing is required to obtain calibrated results across manufactured sensors. Various methods have been utilized to obtain the calibrated result in presence of sensor variations. One such method is manual calibration of the electronics interface. However, the manual calibration procedure significantly increases the installation time of the new sensor. It further requires a higher training level for the personnel required for the sensor installation. Another method is to install a new electronics interface along with the new sensor installation. The new electronics interface is coupled to the new sensor and is calibrated with the calibration data of that sensor. However, replacing both the sensor and the electronics interface reduces the flexibility of inventory management and reduces the overall life of the system to that of the shortest life component.

In some instances, the sensor performance may be a function of the combination of the sensor element, cabling and electronics. Requiring that the three components be replaced at the same time poses difficulty in installation. It the case of aircraft engine installations for example, it is desirable to maintain the cabling even if the sensor element or electronics need to be replaced. This avoids costly and time consuming wire routing.

Thus, there is a need for a method or a system to obtain desired calibrated results in presence of the sensor variations and without the need of manual calibration.

BRIEF DESCRIPTION

In accordance with one exemplary embodiment of the present invention, a sensor system is provided. The system includes a clearance sensor for measuring a clearance parameter between a stationary component and a rotating component of a rotating machine and to output a clearance measurement signal. The system also includes a sensor memory attached to the sensor. A first sensor information is stored in the sensor memory. The system further includes a electronics interface memory for storing a second sensor information and an electronics interface, which reads the first and the second sensor information and matches the clearance sensor with a respective plurality of calibration data based on the first and the second sensor information.

In accordance with another exemplary embodiment of the present invention, a method for calibrating a clearance sensor is provided. The method includes storing a first sensor information in a clearance sensor memory. The method also includes storing a second sensor information in a electronics interface memory and reading the first sensor information from the clearance sensor memory. The method further includes calibrating the clearance sensor based on the first sensor information and the second sensor information.

In accordance with one embodiment of the present invention, a calibrated sensor is provided. The sensor includes a sensor element and a memory coupled to the sensor element. A plurality of sensor specific information is stored in the memory.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail herein, embodiments of the invention include a system and a method for self-calibration of clearance measurement system. Although the present discussion focuses on clearance measurement systems, it is applicable to any measurement system, such as a temperature measurement system or a pressure measurement system.

Figure 1:
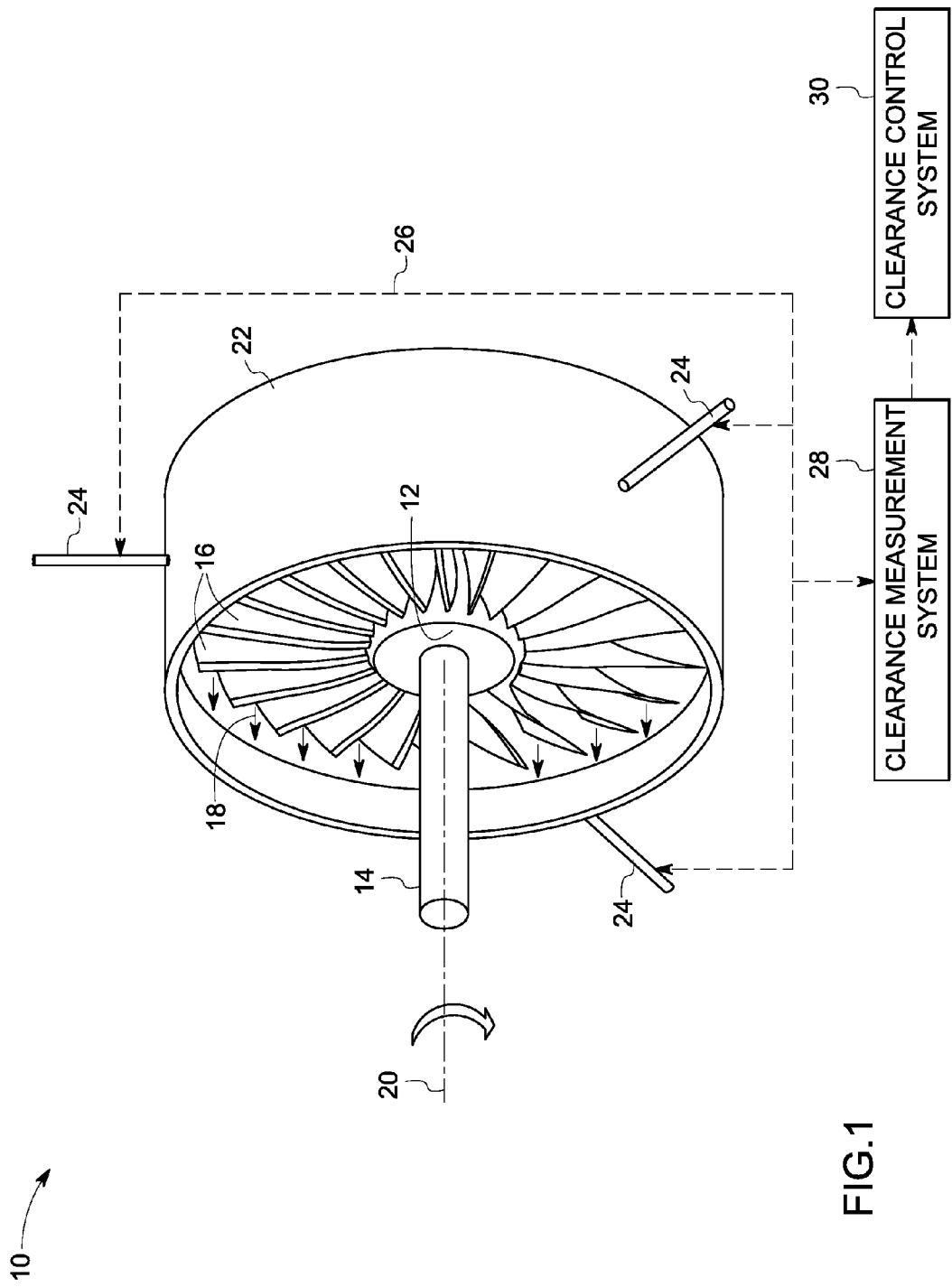
FIG. 1 is a diagrammatical representation of a rotating machine having a sensor system, in accordance with an embodiment of the present invention.

FIG. 1 is a perspective view of an exemplary rotating machine, such as an aircraft engine turbine 10, wherein aspects of the present technique can be incorporated. It should be noted here, however, that the present technique can be used in any other rotating machine such as but not limited to steam turbine and gas turbine. The turbine includes a rotor 12 mounted on a shaft 14. A plurality of turbine blades 16, are affixed to the rotor 12. In operation, the blades 16 are subject to a fluid 18 or steam at a high temperature and pressure, which does work on the blades 16 and causes them to rotate about an axis 20. The blades 16 rotate within a stationary housing or shroud 22 that is positioned approximately radially and circumferentially around the blades. There is a relatively small clearance between the blades 16 and the shroud 22 to prevent excessive leakage of the working fluid between the blades 16 and the shroud 22. In the ideal no loss system, there should be no clearance, so all the fluid will work on blades 16 only. However, that configuration will make movement of blades impossible due to the resistance between the blades 16 and the shroud 22 or to prevent rubs between the rotor blades 16 and the shroud 22. A zero clearance system is also impractical because of vibrations.

In one embodiment, one or more clearance sensors 24 are disposed within and circumferentially around the stationary shroud 22. In the illustrated embodiment, the clearance sensors 24 include capacitive probes. Capacitive probe sensors provide variable capacitance as a representation of the clearance. In certain embodiments, the clearance sensors 24 may include microwave based sensors, optical sensors, or eddy current sensors. Each of the sensors 24 is configured to generate a signal indicative of a radial and/or an axial position of the blades 16 with respect to the shroud 22 at their respective circumferential locations. The sensor signals 26 are transmitted to a clearance measurement system 28 for measuring the clearance. Further, the clearance measurement through the clearance measurement system 28 is used for controlling the clearance between the shroud 22 and the turbine blades 16 via a clearance control system 30.

Figure 2:
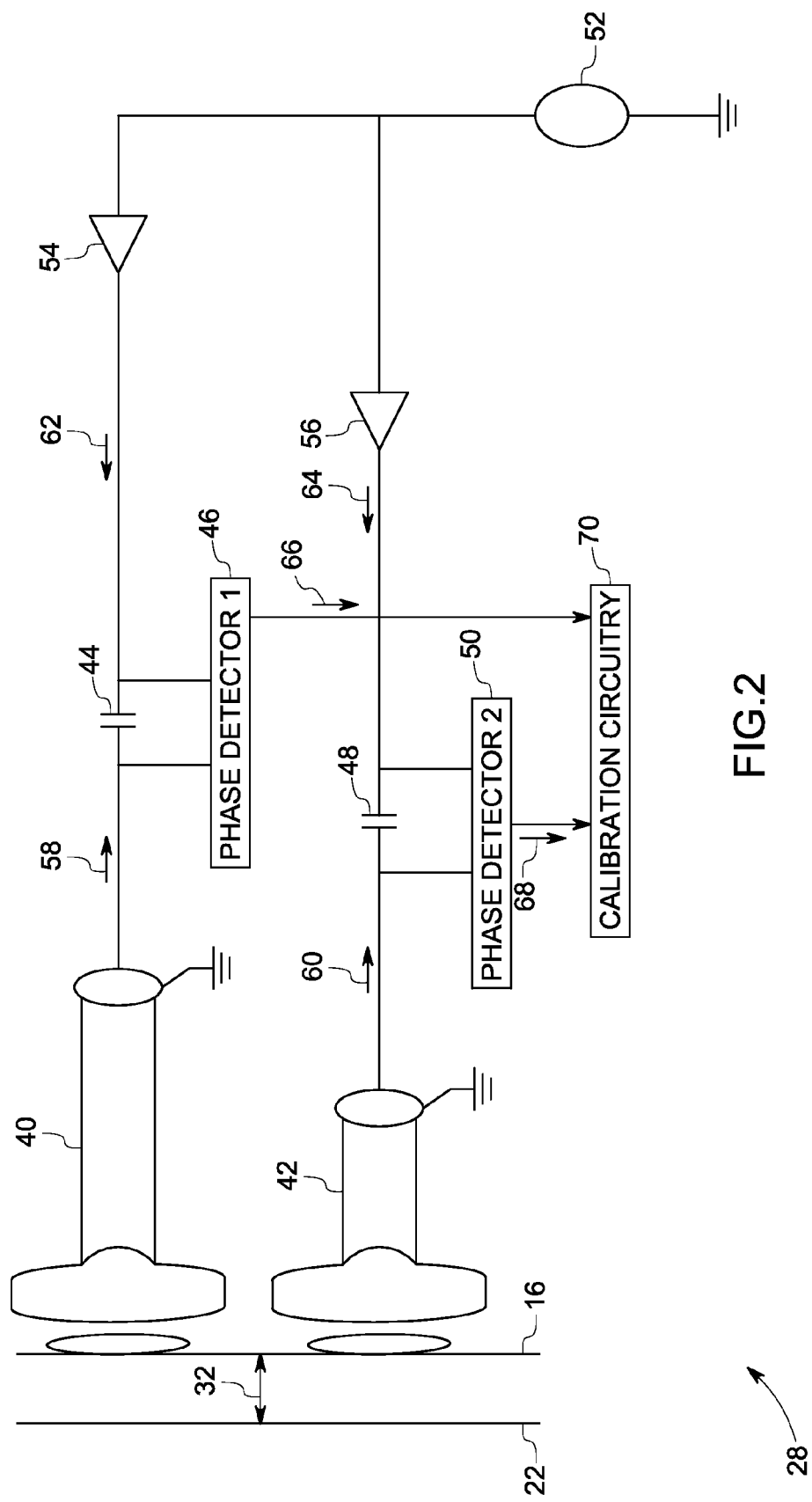
FIG. 2 is a diagrammatical representation of a sensor system of FIG. 1, in accordance with an embodiment of the present invention.

FIG. 2 illustrates an exemplary configuration of a clearance measurement system 28 of FIG. 1. The system 28 in this embodiment comprises first and second sensors 40, 42 configured to generate first and second measurement signals representative of first and second capacitance values between the shroud 22 and the rotor blades 16 of steam turbine of FIG. 1.

In this example, the clearance 32 between the shroud and the rotor blades of the turbine is calculated by ratiometric techniques from first and second signals of first and second sensors 40, 42. A bidirectional coupler 44 and a phase detector 46 are coupled to the first sensor 40 for measuring the capacitance through the first sensor 40. Similarly, a bidirectional coupler 48 and a phase detector 50 are coupled to the second sensor 42 for measuring the capacitance through the second sensor 42. A signal generator 52 is coupled to the first and second sensors 40 and 42 for exciting the first and second sensors. Further, first and second amplifiers 54, 56 are coupled to the signal generator 52 to amplify input signals generated from the signal generator 52. The amplifiers 54, 56 are optional depending upon the signal generation capability and filtering can also be used to condition the signal generator output. In one embodiment, a capacitor (not shown) can be deployed in series with each sensors 40, 42 and signal generator 52 and the phase detectors 46, 52 can be coupled on either side of the capacitor.

According to one embodiment, the signal generator 52 at an excitation frequency excites first and second sensors 40, 42 via the first and second excitation signals 62, 64. A first and second reflected signal 58, 60 corresponding to the first and second excited signal 62, 64 will originate from the first and second sensors 40, 42. The capacitance through the first sensor 40 is measured by measuring a phase difference between the excitation signal 62 and the corresponding reflected signal 58 by the bidirectional coupler 44 and the phase detector 46. The phase detector 46 is configured to detect a first reflected signal 58 based upon the excitation frequency to generate first measurement signal 66. Similarly, measuring a phase difference between the excitation signal 64 and the corresponding reflected signal 60 by the bidirectional coupler 48 and the phase detector 50 generates the second measurement signal 68 representative of the capacitance through the second sensor 42. The first and second measurement signals 66 and 68 are then transmitted to a calibration circuitry 70 for calculation of the clearance based upon a function of the first and second measurement signals 66 and 68. In one embodiment the function is a ratio between first and second measurement signals. The calibration circuitry 70 further communicates with sensors 40, 42 to detect variations in sensor parameters. As described herein, the sensor system 28 in this example employs two sensors 40, 42 for capacitive measurements between the rotor blades 22 and the shroud 16. However, other configurations of the sensor system having more sensors are within the scope of the system.

Figure 3:
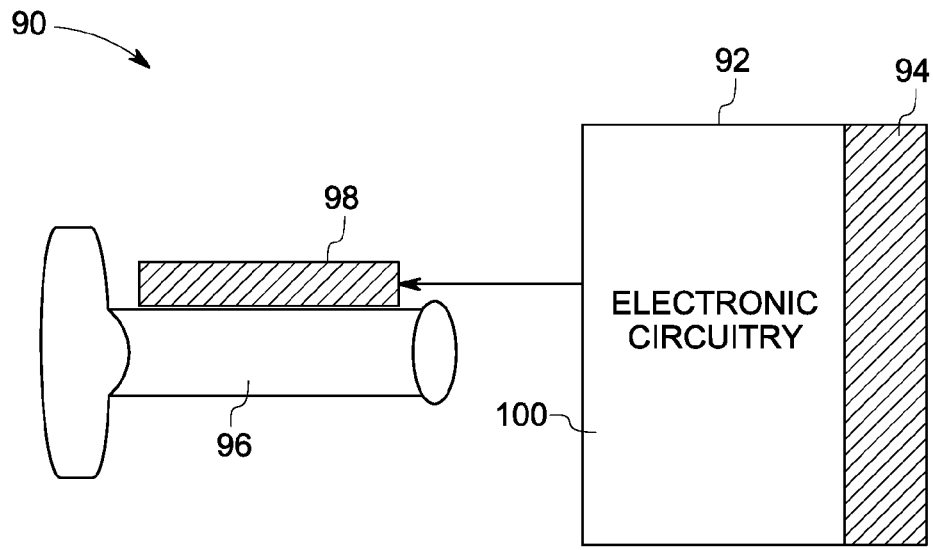
FIG. 3 is a diagrammatical representation of a calibration system of FIG. 1, in accordance with an embodiment of the present invention.

FIG. 3 shows a calibration system 90 of the rotating machine of FIG. 1. In this embodiment a first memory 98 is attached to the clearance sensor 96. The first memory 98 is configured to store sensor specific information. In one embodiment, the sensor specific information is a sensor identification number. In another embodiment, the specific information may be sensor geometry information. In yet another embodiment, the sensor geometry & tolerance are specified so that the probes have nearly a same response. However, the geometry differences across probes can be calibrated out using the sensor memory thereby easing the specs on manufacturing tolerance. In yet another embodiment, the sensor specific information may be calibration data of the sensor. An electronics interface 92 includes an electronic circuitry 100 and a second memory 94. The electronics circuitry 100 then downloads the sensor specific information from the first memory 98 of the clearance sensor 96 and to the second memory 94 attached to an electronic circuitry. A calibration module then uses the data stored in the second memory 94 and the signals from the phase detectors 46, 50 of FIG. 2 and outputs a signal representing the clearance between a stationary and a rotating body of the rotating machine.

For gas turbine engine applications, the temperature at the sensor location is generally 600 to 800 Fahrenheit. Thus, the first memory 98 needs to survive and retain the data at such high temperatures. In one embodiment, the data in the first memory 98 is downloaded to the second memory by the electronics interface only at the start of the sensor installation. In this embodiment, a memory that can withstand high temperature for a short duration may be envisaged. In this embodiment, the second memory is located in or near the sensor electronics which is located at a cooler location, or otherwise supplied with a means of active cooling to maintain the temperature within the limits of operation of electronic devices.

Various types of memories can be used to store the sensor specific information, such as electrical memory, electronic non-volatile memory (electronic NVM) and mechanical memory. Electrical memories are analog in nature. In other words, it consists of an analog circuit. The electrical memory is expandable by adding multiple memory elements in parallel. In one embodiment, each memory element consists of a resistive network, wherein a resistor value is chosen according to a scaling ratio from a proto-calibration curve. Addition of each memory element requires additional wiring in the memory circuit. Thus, memory expansion of electrical memories requires complex wiring. The resolution of these memories is generally low. In one embodiment the resolution is 8 bits. In another embodiment, each element consists of a resonance circuit the resonance frequency of which is chosen according to a scaling ratio from a proto-calibration curve. In yet another embodiment, the memory may include a combination of resistive network and resonance circuit. It should be noted here that the invention is not restricted to resistive or resonance circuit, other similar elements and combination of elements is also within the scope of this invention.

In one embodiment, a number of electrical memory elements are connected through an electrically controlled switch to sequentially connect (multiplex) the elements to the wiring. A large number of element may be multiplexed on a single set of wires reducing the wiring complexity while providing a large number of stored parameters.

Electronic NVM retain stored information even without a power source. Electronically Erasable Programmable Read Only Memory (EEPROM) is one type of electronic NVM. EEPROM can be programmed and erased electrically using field emission (more commonly known as "Fowler-Nordheim tunneling"). The stored information retention capability of EEPROMs deteriorate with temperature. In one embodiment the stored information retention capability of EEPROM is limited to 125° C. It should be noted, however, that EEPROMs used in automotive applications have been demonstrated up to 180° C. Serial bus interface and parallel bus interface are two main types of electrical interfaces used in EEPROM devices. EEPROM memory expansion using serial bus interface requires low wiring complexity compared to electrical memories. Another advantage of EEPROM is it can be delivered in a wide range of configurations, from 16 bits to very-high bit-count blocks greater than 1 Megabyte.

In one embodiment, mechanical memory is used to store sensor specific information as explained earlier. The advantage of mechanical memories is they can retain stored information up to quite a high temperature. In one embodiment they can retain the information up to 400° C. Mechanical memories allow logic state information to be sequentially entered therein, and subsequently read out in the same sequence in which the information was entered into the memory. Thus, mechanical memories are also referred to as first-in-first-out (FIFO) memories. The mechanical memory can be formed as a volatile memory or as a nonvolatile memory. In one embodiment, the mechanical memory is implemented using MEMS technology.

Figure 4:
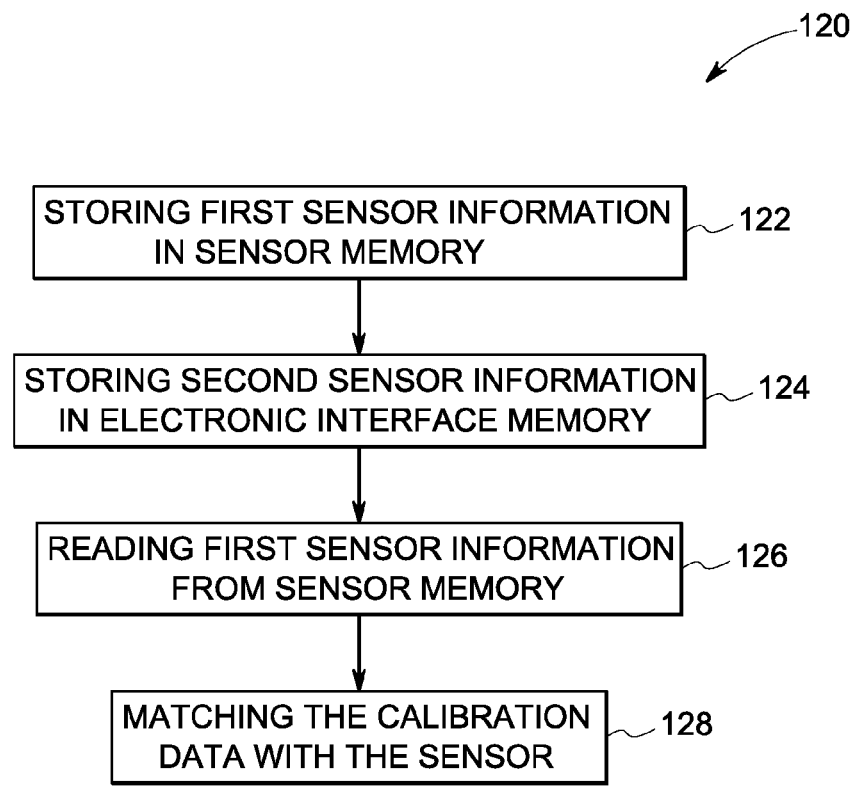
FIG. 4 is a flowchart illustrating steps of calibration of the sensor system, in accordance with an embodiment of the present invention.

FIG. 4 is a flow chart representing steps in an exemplary method 120 of calibrating a sensor. The method 120 includes storing a first information of the sensor in the sensor memory, in step 122. In one embodiment, the first information is calibration data of the sensor. In another embodiment, the first information is an identification number of the sensor. In one embodiment, the first information is a scaling factor for the respective sensor with respect to the calibration data of a proto-sensor. In yet another embodiment, the first information is a mathematical relationship between the clearance between the stationary and rotating components and the clearance measurement signal from the sensor. The method 120 further includes storing a second information of the sensor in the electronics memory, in step 124. In one embodiment, the second information is calibration data of various sensors with a respective identification number for each calibration data point. In another embodiment, the second information may be a single calibration data point of a proto-sensor.

In step 126 of the method 120, the electronics interface communicates with the sensor memory and in step 128 the electronics interface matches the sensor or the first information with its respective plurality of calibration data or the second information. In one embodiment, the electronics interface downloads the calibration data of the sensor from the sensor memory. In another embodiment, the electronics interface determines the sensor identification number from the sensor memory and then matches the sensor identification number to the respective plurality of calibration data stored in the electronics interface memory. In another embodiment, the electronics interface reads the scaling factor from the sensor memory and applies it to the proto-calibration data stored in the electronics interface memory and generates new calibration data for the sensor. In yet another embodiment, the electronics interface determines the mathematical relationship from the sensor memory and uses the mathematical relationship to calculate the clearance between the stationary and the rotating component of the rotary machine. In operation of the rotary machine, the electronics interface periodically queries the sensor memory to detect whether the old sensor is replace by a new sensor. If the replacement is detected, then the electronics interface updates the calibration data.

In one embodiment, if the sensor replacement is detected from a change in the sensor identification number, the electronics interface flags an operator to download the new calibration data in the electronics interface memory. The operator then manually enters the calibration data of the sensor in the electronics interface memory. Thus, it eliminates the possibility of mismatch between the sensor and the calibration data.

In one embodiment, the sensor memory is a read/write memory. The electronics interface tracks the sensor deterioration over time. Revised calibration data is periodically downloaded to the sensor memory. In the event that the electronics box needs to be replaced, the sensor data corresponding to the initial sensor specific calibration, plus the deterioration tracked calibration information are both available to the new electronics box. Thus, in this embodiment, the sensor memory also acts as a history of sensor usage and health.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for calibrating a clearance sensor, the method comprising:
   storing a first sensor information in a clearance sensor memory;
   storing a second sensor information in a electronics interface memory;
   reading the first sensor information from the clearance sensor memory; and
   calibrating the clearance sensor based on the first sensor information and the second sensor information.

2. The method of claim 1 further comprising tracking the clearance sensor deterioration over time based on the first sensor information and the second sensor information.

3. The method of claim 1, wherein storing a second sensor information comprises detecting a change in the clearance sensor and manually downloading a plurality of new calibration data into the electronics interface memory.

4. The method of claim 1, wherein the first sensor information comprises a plurality of calibration data for the clearance sensor.

5. The method of claim 1, wherein the first sensor information comprises a sensor identification number.

6. The method of claim 1, wherein the first sensor information comprises a plurality of scaling parameters with respect to a plurality of proto-calibration data for the clearance sensor.

7. The method of claim 1, wherein the clearance sensor is configured to monitor a clearance between a rotating component and a stationary component, and wherein the first sensor information comprises a mathematical relationship between the clearance between the stationary and rotating components and the clearance measurement signal.

8. The method of claim 1, wherein the second sensor information comprises a plurality of calibration data with a respective identification number for each of the calibration data points.

9. The method of claim 1, wherein the second sensor information comprises a plurality of calibration data for a protosensor.

\* \* \* \* \*